United States Patent
Mandal et al.

(10) Patent No.: US 7,705,878 B2
(45) Date of Patent: Apr. 27, 2010

(54) METHOD AND APPARATUS TO CREATE A DOWN-HOLE VIDEO LOG TO TRANSMIT DOWN-HOLE VIDEO DATA

(75) Inventors: Batakrishna Mandal, Missouri City, TX (US); Wallace R. Gardner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 2108 days.

(21) Appl. No.: 10/437,498

(22) Filed: May 13, 2003

(65) Prior Publication Data
US 2004/0004660 A1    Jan. 8, 2004

Related U.S. Application Data

(63) Continuation-in-part of application No. 09/135,269, filed on Aug. 17, 1998, now abandoned.

(51) Int. Cl.
*H04N 9/47* (2006.01)
*E21B 44/00* (2006.01)

(52) U.S. Cl. ..................... 348/85; 73/152.46
(58) Field of Classification Search .................. 348/85, 348/163, 571, 84, 82; 73/152.46, 865.8; 702/187
See application file for complete search history.

(56) References Cited

U.S. PATENT DOCUMENTS

| | | | |
|---|---|---|---|
| 3,984,627 A * | 10/1976 | Galerne | 348/85 |
| 4,463,378 A | 7/1984 | Rambow | |
| 4,774,573 A * | 9/1988 | Mount et al. | 348/163 |
| 4,855,820 A | 8/1989 | Barbour | |
| 4,945,775 A * | 8/1990 | Adams et al. | 73/865.8 |
| 4,974,168 A | 11/1990 | Marx | 702/187 |
| 5,034,817 A * | 7/1991 | Everett, Jr. | 348/571 |
| 5,134,471 A | 7/1992 | Gendron et al. | |
| 5,140,319 A | 8/1992 | Riordan | |
| 5,168,359 A | 12/1992 | Mills | |
| 5,274,572 A | 12/1993 | O'Neill et al. | |
| 5,594,706 A | 1/1997 | Shenoy et al. | |
| 5,652,617 A * | 7/1997 | Barbour | 348/85 |
| 5,767,400 A * | 6/1998 | Nakano et al. | 73/152.46 |

OTHER PUBLICATIONS

Cobb, C.C., et al.; "A Real Time Fiber Optic Downhole Video System" Offshore Technology Conference, pp. 575-582, 1992.

(Continued)

*Primary Examiner*—Gims S Philippe
(74) *Attorney, Agent, or Firm*—Vinson & Elkins LLP

(57) ABSTRACT

A system for obtaining video data is provided, the system comprising a video camera positioned down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The system also comprises a data extractor to extract information only from the portion comprising the new information from each sequential video frame.

59 Claims, 8 Drawing Sheets

OTHER PUBLICATIONS

Whittaker, J.L., et al.; "Well Preparation—Essential to Successful Video Logging" Society of Petroleum Engineers, pp. 297-308, 1996.

Peters, C.A., et al.; "Development of an Electro-Opto Logging Cable and Video System for Offshore and Other Downhole Applications" Offshore Technology Conference pp. 885-892, 1994.

Starcher, M.G., et al.; "Video Camera Log Used for Water Isolation in the Main Body 'B' Pool, Elk Hills, Field, Kern Co., California—Water and Oil Identification" Society of Petroleum Engineers, pp. 383-394, Mar. 1995.

Ward, Stephen L, et al.; "Diagnosing Production Problems With Downhole Video Surveying at Prudhoe Bay" Society of Petroleum Engineers, pp. 973-978, Nov. 1994.

Maddox, Steve, et al.; "Downhole Video Services Enhance Conformance Technology" Society of Petroleum Engineers, pp. 535-549, May 1995.

Olsen, J.E., et al.; "Case Histories in the Europe/Africa Area Demonstrate Improved Capabilities for Fiber-Optic Video Camera Technology", pp. 421-432, Mar. 1995.

\* cited by examiner

700

Positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame — 720

Extracting information only from the portion comprising the new information from each sequential video frame — 730

Figure 7

METHOD AND APPARATUS TO CREATE A DOWN-HOLE VIDEO LOG TO TRANSMIT DOWN-HOLE VIDEO DATA

CROSS-REFERENCE TO RELATED APPLICATION

This application is a Continuation-in-Part (CIP) of patent application, Ser. No. 09/135,269, to Batakrishna Mandal and Wallace R. Gardner, filed on Aug. 17, 1998 now abandoned.

BACKGROUND OF THE INVENTION

1. Field of the Invention

This invention relates generally to a method and apparatus useful in the exploration of subterranean regions and, more particularly, to a method and apparatus useful in the exploration for, and production of, hydrocarbons from subterranean regions. In various aspects, the present invention relates to a method and apparatus for creating a bore-hole log, a bore-hole video log, a digital bore-hole video log that uses less memory than conventional digital video, and/or for associating digital audio information with a digital bore-hole video log.

2. Description of the Related Art

The visual analysis of well-bores can provide useful information regarding the stratification, fracturing, and layering of various geological formations. The more detailed the visual analysis, the better the ability to characterize a given formation.

Data-gathering, including video and audio data-gathering, of wells can be accomplished by utilizing wireline logs and/or logging-while-drilling (LWD) tools to obtain certain physical characteristics of a formation. Wireline logs require an umbilical (i.e., a wireline) from the surface to provide electrical power and are generally utilized after a well has been drilled. Logging-while-drilling (LWD) tools are used to provide real-time analysis of subsurface formations during the actual drilling operation. Logging-while-drilling (LWD) tools typically include their own power source as the LWD tool string is an integral part of the bottom home assembly and it would be impractical to connect an umbilical from the surface to provide electrical power and/or other requirements of the various LWD tools.

There have been attempts in the prior art to provide visual analysis of a bore-hole. For example, U.S. Pat. No. 4,463,378, issued Jul. 31, 1984, to Rambow, discloses a display system for use with a well logging tool of the type that scans a bore-hole wall by rotating an acoustic transducer while emitting and receiving acoustic energy. The received acoustic or information signals are received and recorded for later use.

U.S. Pat. No. 4,774,573, issued Sep. 27, 1988, to Mount et al., discloses an apparatus for creating a video display from information generated by acoustically scanning a reflecting boundary circumferential bore-hole.

U.S. Pat. No. 4,855,820, issued Aug. 8, 1989, to Barbour, discloses an apparatus and method of visually examining the sidewalls of a bore-hole. The apparatus includes a wide-angle video camera, power supply/triplexer, a telemetry board, an FM modulator video amplifier transmission board, gyroscope data interface board, and a gyroscope for showing the directional orientation of the camera. The orientation and video images are transmitted to a video display monitor on the surface and recorded by a video cassette recorder for a permanent record.

U.S. Pat. No. 5,134,471, issued Jul. 28, 1992, to Gendron et al., discloses a bore-hole camera monitoring system comprising a camera head assembly adapted to be lowered into a bore-hole with the control unit for operating the camera located above ground. The camera head assembly of the '471 device includes a fixed portion and a rotary portion. The fixed portion of the camera head assembly of the '471 device comprises a microcontroller for controlling the operation of the camera, a position encoder for detecting the angular rotation of the camera with respect to the fixed portion of the camera head assembly, and a communication interface including means for multiplexing the video signal generated by the camera. The control unit of the '471 device comprises a computer, a video monitor, and a communication interface. In addition, a depth counter is connected to the computer.

U.S. Pat. No. 5,140,319, issued Aug. 18, 1992, to Riordan, discloses an instrument probe containing a video camera and light source with the power source located at the surface. A support cable contains an optical fiber for conducting camera signals to the surface and conducting power to the instrument.

However, in spite of these advances in the prior art, there is still a need for a method and apparatus to create a visual well-bore log that does not suffer from one or more of the deficiencies of the prior art, deficiencies such as the large memory and/or storage requirements for conventional video logs and/or the inefficient incorporation of digital audio data with a digital video log. There is, thus, a need in the art for a method and apparatus to create a digital video log that utilizes less memory and/or storage capacity than conventional video logs, while providing more relevant information than that provided by conventional video logs. There is also an additional need in the art for an efficient way to incorporate digital audio data with a digital video log.

These and other needs in the art will become apparent to those of skill in the art upon review of this specification, including the drawings and claims.

The present invention is directed to overcoming, or at least reducing the effects of, one or more of the problems set forth above.

SUMMARY OF THE INVENTION

In one aspect of the present invention, a system for obtaining video data is provided, the system comprising a video camera positioned down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The system also comprises a data extractor to extract information only from the portion comprising the new information from each sequential video frame.

In another aspect of the present invention, a system for obtaining video data is provided, the system comprising a video camera positioned down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The system also comprises a microphone positioned down the bore-hole to obtain an audio signal and a data extractor to extract information only from the portion comprising the new information from each sequential video frame.

In yet another aspect of the present invention, a method for obtaining video data is provided, the method comprising positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The method also comprises extracting information only from the portion comprising the new information from each sequential video frame.

In still yet another aspect of the present invention, a method for obtaining video data is provided, the method comprising positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The method also comprises positioning a microphone down the bore-hole to obtain an audio signal and extracting information only from the portion comprising the new information from each sequential video frame.

In another aspect of the present invention, a computer-readable, program storage device is provided, encoded with instructions that, when executed by a computer, perform a method, the method comprising positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The method also comprises extracting information only from the portion comprising the new information from each sequential video frame.

In still another aspect of the present invention, a computer-readable, program storage device is provided, encoded with instructions that, when executed by a computer, perform a method, the method comprising positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The method also comprises positioning a microphone down the bore-hole to obtain an audio signal and extracting information only from the portion comprising the new information from each sequential video frame.

In yet another aspect of the present invention, a computer programmed to perform a method is provided, the method comprising positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The method also comprises extracting information only from the portion comprising the new information from each sequential video frame.

In still yet another aspect of the present invention, a computer programmed to perform a method is provided, the method comprising positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The method also comprises positioning a microphone down the bore-hole to obtain an audio signal and extracting information only from the portion comprising the new information from each sequential video frame.

In another aspect of the present invention, a device is provided, the device comprising means for positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The device also comprises means for extracting information only from the portion comprising the new information from each sequential video frame.

In yet another aspect of the present invention, a device is provided, the device comprising means for positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. The device also comprises means for positioning a microphone down the bore-hole to obtain an audio signal and means for extracting information only from the portion comprising the new information from each sequential video frame.

It is an object of the present invention to provide a method and apparatus to create a visual well-bore log that does not suffer from one or more of the deficiencies of the prior art, deficiencies such as the large memory and/or storage requirements for conventional video logs and/or the inefficient incorporation of digital audio data with a digital video log.

It is another object of the present invention to provide a method and apparatus to create a digital video log that utilizes less memory and/or storage capacity than conventional video logs, while providing more relevant information than that provided by conventional video logs.

It is yet another object of the present invention to provide an efficient way to incorporate digital audio data with a digital video log.

These and other objects of the present invention will become apparent to those of skill in the art upon review of the present specification, including the drawings and the claims.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIGS. 1-8 schematically illustrate various embodiments of a method, a system and a device according to the present invention;

FIG. 1 schematically illustrates a drilling operation according to various illustrative embodiments showing a drilling rig 120 and a downhole video module 100;

FIG. 2 schematically illustrates, in the form of a flow chart, an exemplary embodiment of a method by which a downhole video log may be obtained;

FIG. 3 schematically illustrates operation of a focused zone extractor 206 in various exemplary embodiments;

FIG. 4 schematically illustrates further operation of the focused zone extractor 206 in various exemplary embodiments;

FIG. 5 schematically illustrates wavelet compression used to compress a video digital signal 205 in various exemplary embodiments;

FIG. 6 schematically illustrates, in the form of a flow chart, an exemplary embodiment of a method by which a downhole audio-video log may be obtained;

FIG. 7 schematically illustrates an exemplary embodiment of a method 700 practiced in accordance with the present invention; and FIG. 8 schematically illustrates an exemplary embodiment of a method 800 practiced in accordance with the present invention.

Figure 1:
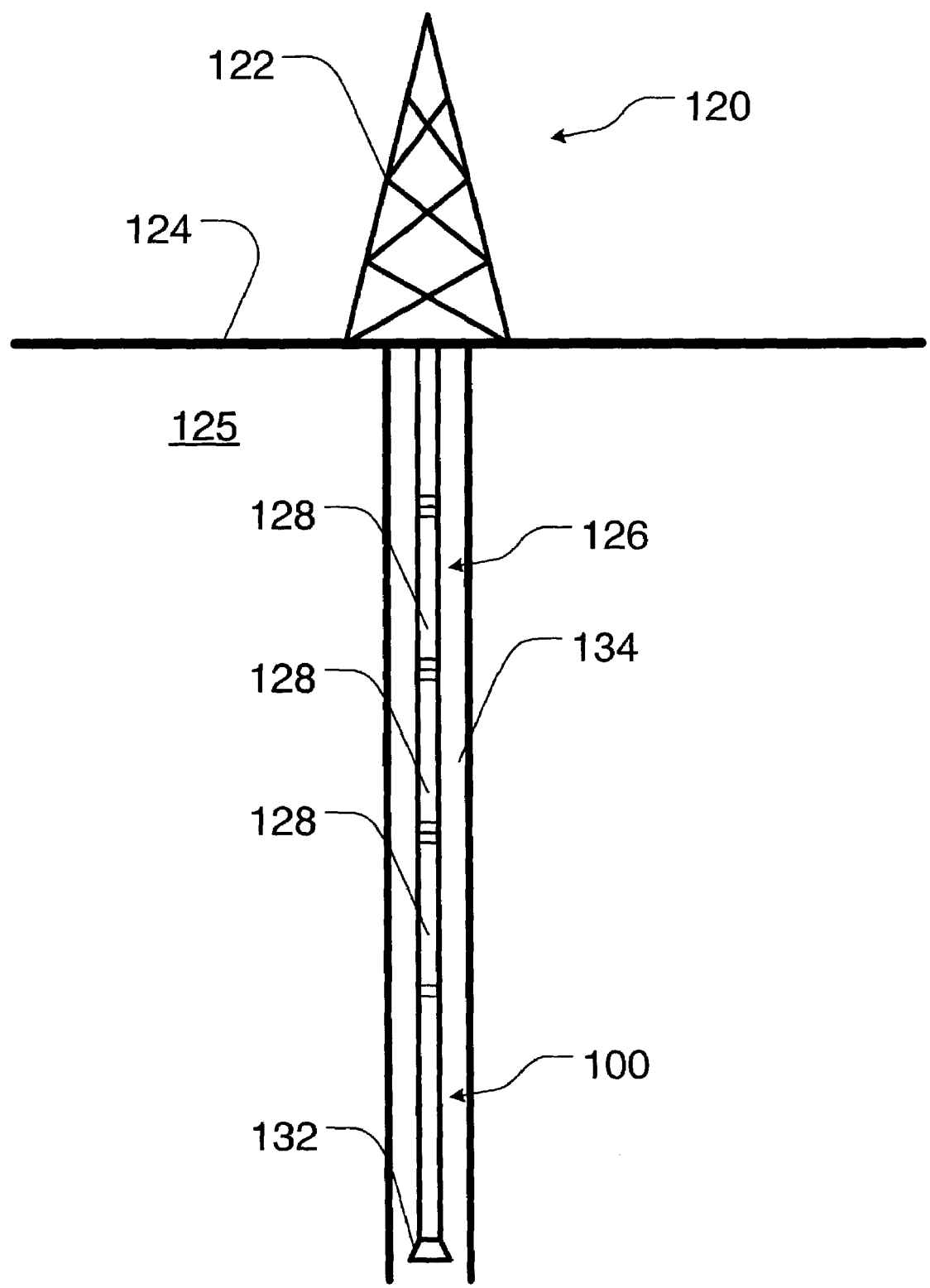

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method, a system and a device according to the present invention are shown in FIGS. 1-8. As shown in FIG. 1, a drilling operation according to various illustrative embodiments is shown, including a drilling rig 120 and a downhole video module 100. The drilling rig 120 is generally a rotary drilling rig of the type that is well known in the drilling art and comprises a mast 122 that rises above the ground 124. The rotary drilling rig 120 is fitted with lifting gear (not shown) from which is suspended a drill string 126 formed by a multiplicity of drill pipes 128 screwed into one another, the drill string 126 having at its lower downhole end a drill bit 132 for the purpose of drilling a well bore 134. A downhole video camera module 100 may be located in the drill string 126 in any suitable location and by any suitable manner know to those in the relevant art.

Figure 2:
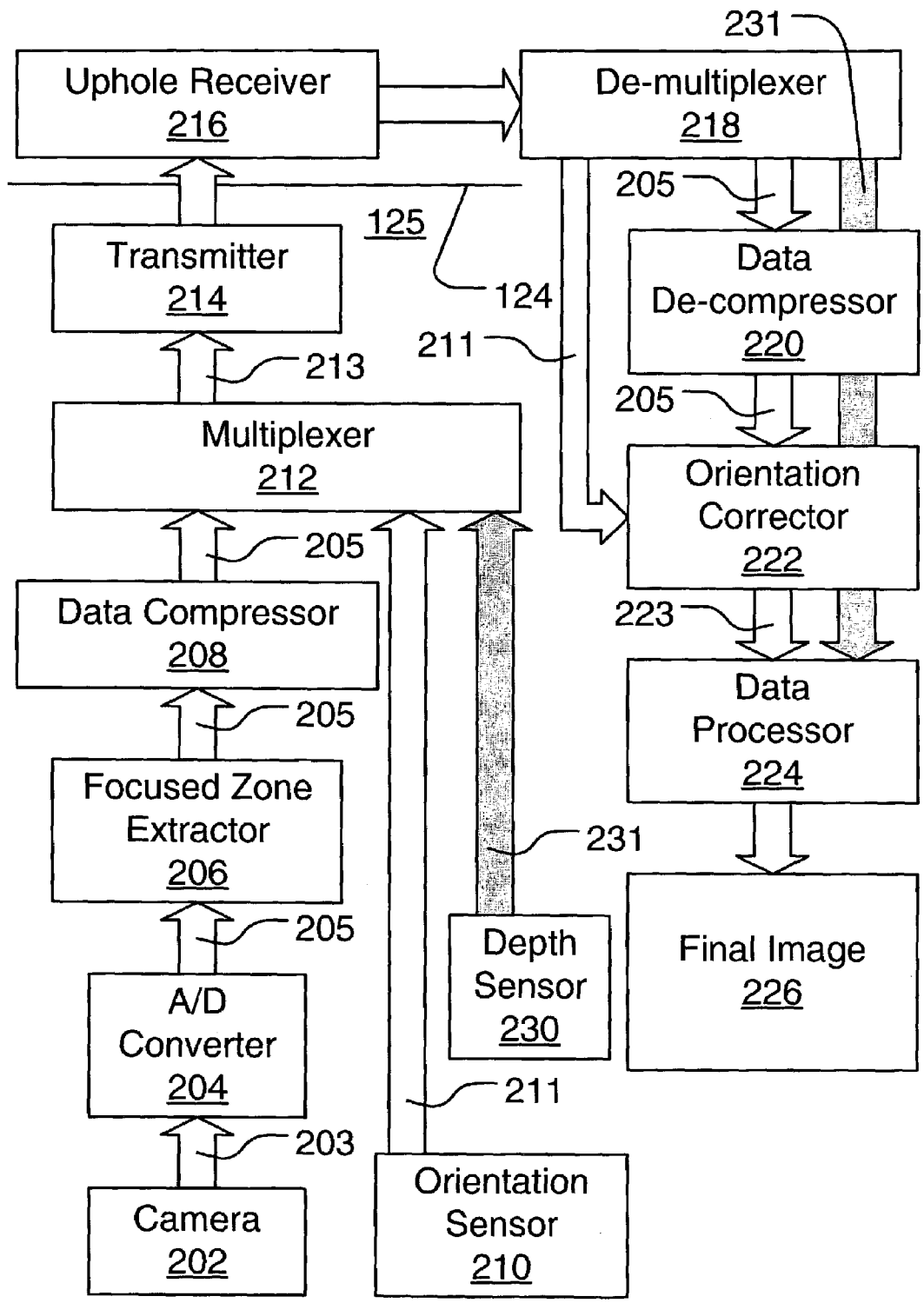

As shown in FIG. 2, an illustrative embodiment of a method by which a downhole video log may be obtained is schematically illustrated in the form of a flow chart. Generally, an uphole receiver 216 receives data from a downhole analog video camera 202 disposed in the downhole video camera module 100. The uphole receiver 216 may be of any type suitable to receive data from the downhole analog video camera 202. The downhole analog video camera 202 may be any type of visual data acquisitioner. The downhole analog video camera 202 obtains a video analog data signal 203 that is converted into a video digital signal 205 via an analog-to-digital (A/D) converter 204. The analog-to-digital (A/D) converter 204 may be any suitable analog-to-digital (A/D) converter. Although the analog-to-digital (A/D) converter 204 is shown in FIG. 2 as being separate from the downhole analog video camera 202, in alternative illustrative embodiments, the analog-to-digital (A/D) converter 204 and the downhole analog video camera 202 may be integrated in such a way that the downhole video camera 202 itself generates the digital video signal 205. The video digital signal 205 may be transmitted to a focused zone extractor 206.

Figure 3:
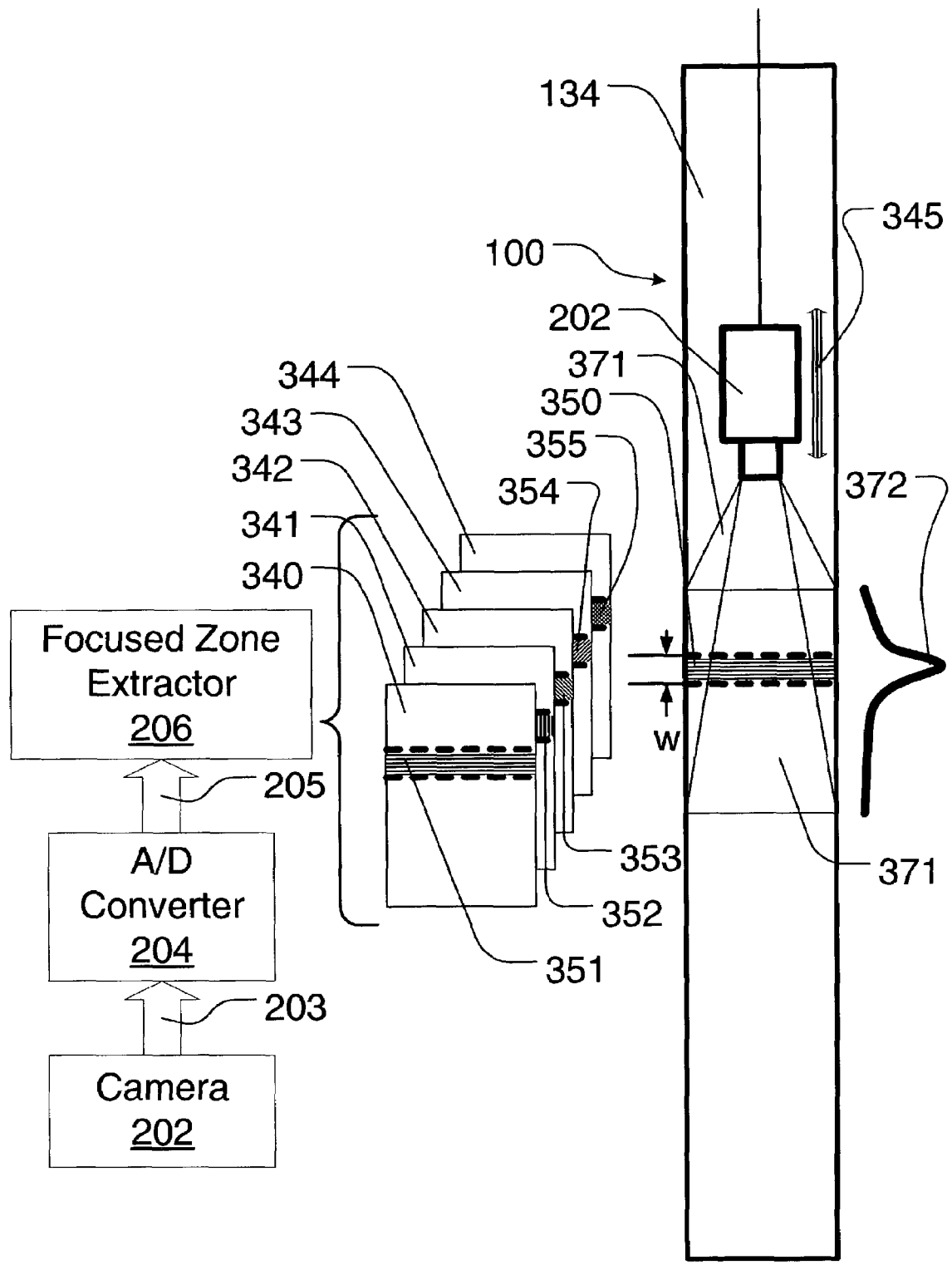

As shown in FIG. 3, the operation of the focused zone extractor 206 in various illustrative embodiments is schematically described in more detail. The video digital signal 205 may comprise various sequential video frames, illustrated by sequential video frames 340-344, as shown in FIG. 3. Each of the sequential video frames 340-344 may contain information. A portion of the information of each of the sequential video frames 340-344 may comprise new information not found on a previous sequential video frame. The focused zone extractor 206 in various illustrative embodiments may comprise a data extractor that may extract information only from the portion comprising the new information from each of the sequential video frames 340-344. For example, in various illustrative embodiments, the focused zone extractor 206 may extract a focused zone 350 of width w from each sequential video image, the focused zone 350 of width w comprising new information not found on a previous sequential video frame. The focused zone extractor 206 may then send these focused zones 351-355, extracted from the respective sequential video frames 340-344, to the uphole receiver 216.

The downhole analog video camera 202 may take pictures at the rate of about 30 video frames per second. In various illustrative embodiments, a 30 feet per minute rate log, obtained by the downhole analog video camera 202 taking pictures at the rate of about 30 video frames per second, while moving up (or down) the well bore 134 as indicated by arrow 345, may sample about 6 inches (15 cm) of the well bore 134 every second spread over about 30 video frames, giving a vertical resolution of at least about 0.2 inches (0.5 cm) of the well bore 134 per video frame. Equivalently, there are about 5 video frames for every inch (2.54 cm) of the well bore 134, in these illustrative embodiments, wherein a 30 feet per minute rate log is obtained using the downhole analog video camera 202 taking pictures at the rate of about 30 video frames per second. Note that a 30 feet per minute rate log is the same as a 360 inches per 60 seconds rate log, which is the same as a 6 inches per second rate log.

In various alternative illustrative embodiments, a 60 feet per minute rate log, obtained by the downhole analog video camera 202 taking pictures at the rate of about 30 video frames per second, while moving up (or down) the well bore 134 as indicated by the arrow 345, may sample about 12 inches (30 cm) of the well bore 134 every second spread over about 30 video frames, giving a vertical resolution of at least about 0.4 inches (1 cm) of the well bore 134 per video frame, about half the vertical resolution of the 30 feet per minute rate log. Equivalently, there are about 5 video frames for every two inches (5 cm) of the well bore 134, in these alternative illustrative embodiments, wherein a 60 feet per minute rate log is obtained using the downhole analog video camera 202 taking pictures at the rate of about 30 video frames per second. Note that a 60 feet per minute rate log is the same as a 720 inches per 60 seconds rate log, which is the same as a 12 inches per second rate log.

In various other illustrative embodiments, a 15 feet per minute rate log, obtained by the downhole analog video camera 202 taking pictures at the rate of about 30 video frames per second, while moving up (or down) the well bore 134 as indicated by the arrow 345, may sample about 3 inches (7.6 cm) of the well bore 134 every second spread over about 30 video frames, giving a vertical resolution of at least about 0.1 inches (0.254 cm) of the well bore 134 per video frame, about twice the vertical resolution of the 30 feet per minute rate log. Equivalently, there are about 10 video frames for every inch (2.54 cm) of the well bore 134, in these other illustrative embodiments, wherein a 15 feet per minute rate log is obtained using the downhole analog video camera 202 taking pictures at the rate of about 30 video frames per second. Note that a 15 feet per minute rate log is the same as a 180 inches per 60 seconds rate log, which is the same as a 3 inches per second rate log.

In various illustrative embodiments, generally, an R feet per minute rate log, obtained by the downhole analog video camera 202 taking pictures at the rate of about f video frames per second, while moving up (or down) the well bore 134 as indicated by the arrow 345, may sample about $$\frac{R}{5}$$

inches $$\left(\frac{2.54R}{5} \text{cm}\right)$$

of the well bore 134 every second spread over about f video frames, giving a vertical resolution of at least about $$\frac{R}{5f}$$

inches $$\left(\frac{2.54R}{5f} \text{cm}\right)$$

of the well bore 134 per video frame. Equivalently, there are about $$\frac{5f}{R}$$

video frames for every inch (2.54 cm) of the well bore 134, in these illustrative embodiments, wherein an R feet per minute rate log is obtained using the downhole analog video camera 202 taking pictures at the rate of about f video frames per second. Note that an R feet per minute rate log is the same as a 12R inches per 60 seconds rate log, which is the same as an $$\frac{R}{5}$$

inches per second rate log.

As shown in FIG. 3, in various illustrative embodiments, instead of having all of the data from each full video frame sent to the uphole receiver 216 from the downhole analog video camera 202 disposed in the downhole video camera module 100, the focused zone extractor 206 may extract a focused zone 350 of width w from each sequential video image, the focused zone 350 of width w comprising new information not found on a previous sequential video frame. The focused zone extractor 206 may then send these focused zones 351-355, extracted from the respective sequential video frames 340-344, to the uphole receiver 216. The focused zone 350 of width w may correspond to the region of the well bore 134 that receives a greater amount of reflection light intensity 371, as schematically illustrated by reflection light intensity curve 372. For example, in various illustrative embodiments, the focused zone 350 of width w may correspond to the region of the well bore 134 that receives the reflection light intensity 371 that falls within the area under the reflection light intensity curve 372 between respective half maximum value points.

Figure 4:
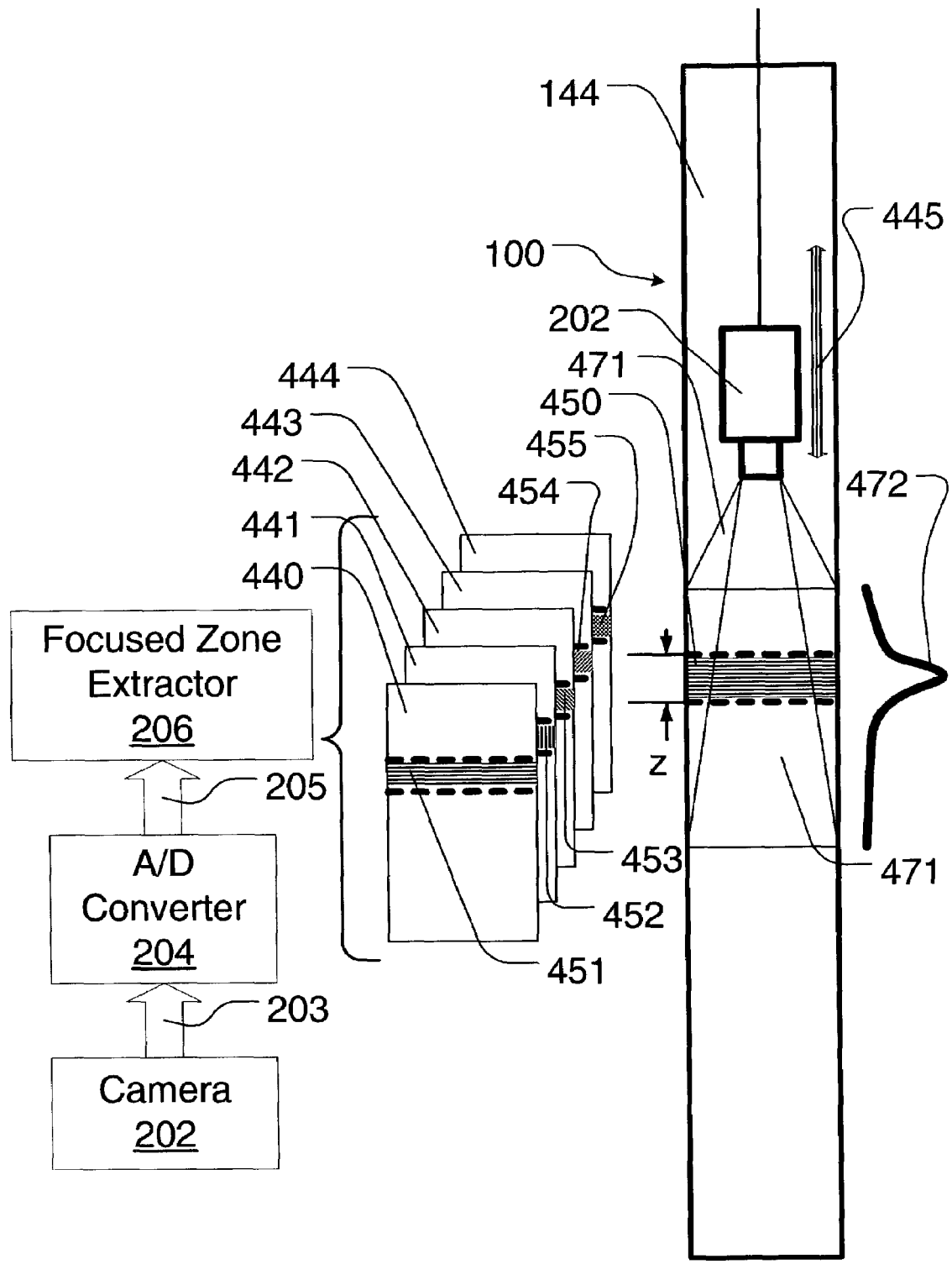

The width w of the focused zone 350 may depend on the logging speed, the well bore 134 diameter, and on the reflection light intensity 371. For example, by increasing the logging speed, as shown in FIG. 4, in various alternative illustrative embodiments, as described above, the video digital signal 205 may comprise various video frames, illustrated by sequential video frames 440-444. The downhole analog video camera 202 may take pictures at the rate of about 30 video frames per second. In these various alternative illustrative embodiments, as described above, the 60 feet per minute rate log, obtained by the downhole analog video camera 202 taking pictures at the rate of about 30 video frames per second, while moving up (or down) the well bore 134 as indicated by the arrow 445, may sample about 12 inches (30 cm) of the well bore 134 every second spread over about 30 video frames. This gives a vertical resolution of at least about 0.4 inches (1 cm) of the well bore 134 per video frame, which is about half the vertical resolution of the 30 feet per minute rate log that logs at about half the logging speed of the 60 feet per minute rate log. Similarly, the width z of the focused zone 450 may depend on the logging speed. The width w of the focused zone 350, obtained with a logging speed of about 30 feet per minute, is about half the width z of the focused zone 450, obtained with a logging speed of about 60 feet per minute.

As shown in FIG. 4, in various alternative illustrative embodiments, instead of having all of the data from each full video frame sent to the uphole receiver 216 from the downhole analog video camera 202 disposed in the downhole video camera module 100, the focused zone extractor 206 may extract a focused zone 450 of width z from each sequential video image, the focused zone 450 of width z comprising new information not found on a previous sequential video frame. The focused zone extractor 206 may then send these focused zones 451-455, extracted from the respective sequential video frames 440-444, to the uphole receiver 216. The focused zone 450 of width z may correspond to the region of the well bore 134 that receives a greater amount of reflection light intensity 471, as schematically illustrated by reflection light intensity curve 472. For example, in various illustrative embodiments, the focused zone 450 of width z may correspond to the region of the well bore 134 that receives the reflection light intensity 471 that falls within the area under the reflection light intensity curve 472 between respective half maximum value points.

In various other illustrative embodiments, increasing the reflection light intensity 471 overall may increase the reflection light intensity 471 that falls within the area under the reflection light intensity curve 472 between respective half maximum value points and, hence, may increase the focused zone 450 width z. In various alternative illustrative embodiments, an increased well bore 134 diameter may effectively narrow the reflection light intensity curve 472 and, hence, may decrease the reflection light intensity 471 that falls within the area under the reflection light intensity curve 472 between respective half maximum value points, decreasing the focused zone 450 width z. In various illustrative embodiments, generally, the width w of the focused zone 350 may depend on the logging speed (such as an R feet per minute rate log), the well bore 134 diameter D, and on the reflection light intensity 371 (such as I) as follows:

$$w = k\frac{RI}{D},$$

where k is an appropriate constant of proportionality.

The CCIR-601 standard (using a 4:2:2 component system) provides a standard method of encoding analog television and/or analog video information in digital form. The luminance and color difference components are sampled with a precision of 8 bits, which gives acceptable quality compared with the original analog television signal. The standard National Television System Committee (NTSC) analog color video frame contains 525 lines, with a field rate of 60 Hz, and has three components: luminance, blue chrominance (color difference) and red chrominance (color difference), for example. According to the CCIR-601 standard (using a 4:2:2 component system), the luminance component of the standard NTSC analog color video frame is sampled to produce an image of 525 lines, each line containing 858 luminance samples, while each of the two chrominance (color difference) components of the standard NTSC analog color video frame is sampled to produce an image of 525 lines, each line containing 429 chrominance (color difference) samples. The chrominance (color difference) signals are sampled at a lower rate by halving the horizontal resolution in a typical 4:2:2 component system, which describes the sampling frequencies of the luminance and chrominance (color difference) signals. The analog luminance signal is sampled at 4 times the frequency of the color subcarrier and the two analog chrominance (color difference) signals are each sampled at twice the frequency of the color subcarrier. The total number of bits required per analog color video frame, according to the CCIR-601 standard (using a 4:2:2 component system), is, thus, 8×[(525×858)+2×(525×429)]=8×[(450,450)+2×(225,225)]=7,207,200. Consequently, sending all of the information contained in an analog color video obtained at a rate of 30 video frames per second would require a data transmission rate of about $2.16216 \times 10^8$ bits/s=216.216 Mbits/s=27.027 Mbytes/s, where 1 byte=8 bits. In various illustrative embodiments, as shown in FIG. 3, the focused zone extractor 206 may extract a focused zone 350 of width w corresponding to at most about 5 lines of the 525 lines from each sequential video frame, without any substantial loss of horizontal resolution. The focused zone extractor 206 may then send the extracted focused zones 351-355, each corresponding to at most about 5 lines of the 525 lines from the respective sequential video frames 340-344, to the uphole receiver 216.

In various illustrative embodiments, a 30 feet per minute rate log, obtained by the downhole analog video camera 202 taking pictures at the rate of about 30 video frames per second, while moving up (or down) the well bore 134 as indicated by arrow 345, may sample about 6 inches (15 cm) of the well bore 134 every second spread over about 30 video frames, giving a vertical resolution of at least about 0.2 inches (0.5 cm) of the well bore 134 per video frame. For these various illustrative embodiments, since the focused zone extractor 206 may extract the focused zone 350 of width w corresponding to at most about 5 lines of the 525 lines from each sequential video frame, a vertical resolution of at least about 0.04 inches (0.1 cm) of the well bore 134 may be obtained. The total number of bits required to encode only about 5 lines of the 525 lines from an analog color video frame, according to the CCIR-601 standard, is 8×[(5×858)+2×(5×429)]=8×[(4290)+2×(2145)]=68,640. Consequently, sending only the new information contained in at most about 5 lines of the 525 lines from each sequential video frame of an analog color video obtained at a rate of 30 video frames per second would require a data transmission rate of only at most about $2.0592 \times 10^6$ bits/s=2.0592 Mbits/s=0.2574 Mbytes/s, where 1 byte=8 bits. Sending a gray image instead of a color image would require only about half that amount of new information, giving a data transmission rate of only at most about $1.0296 \times 10^6$ bits/s=1.0296 Mbits/s=0.1287 Mbytes/s.

In various alternative illustrative embodiments, as shown in FIG. 3, the focused zone extractor 206 may extract a focused zone 350 of width w corresponding to at most about 3 lines of the 525 lines from each sequential video frame, without any substantial loss of horizontal resolution. The focused zone extractor 206 may then send the extracted focused zones 351-355, each corresponding to at most about 3 lines of the 525 lines from the respective sequential video frames 340-344, to the uphole receiver 216.

In various illustrative embodiments, a 30 feet per minute rate log, obtained by the downhole analog video camera 202 taking pictures at the rate of about 30 video frames per second, while moving up (or down) the well bore 134 as indicated by arrow 345, may sample about 6 inches (15 cm) of the well bore 134 every second spread over about 30 video frames, giving a vertical resolution of at least about 0.2 inches (0.5 cm) of the well bore 134 per video frame. For these various alternative illustrative embodiments, since the focused zone extractor 206 may extract the focused zone 350 of width w corresponding to at most about 3 lines of the 525 lines from each sequential video frame, a vertical resolution of at least about 0.067 inches (0.17 cm) of the well bore 134 may be obtained. The total number of bits required to encode only about 3 lines of the 525 lines from an analog color video frame, according to the CCIR-601 standard, is 8×[(3×858)+2×(3×429)]=8×[(2574)+2×(1287)]=41,184. Consequently, sending only the new information contained in at most about 3 lines of the 525 lines from each sequential video frame of an analog color video obtained at a rate of 30 video frames per second would require a data transmission rate of only at most about $1.23552 \times 10^6$ bits/s=1.23552 Mbits/s=154.44 kbytes/s, where 1 byte=8 bits. Sending a gray image instead of a color image would require only about half that amount of new information, giving a data transmission rate of only at most about $0.61776 \times 10^6$ bits/s=617.76 kbits/s=77.22 kbytes/s.

In various other alternative illustrative embodiments, as shown in FIG. 3, the focused zone extractor 206 may extract a focused zone 350 of width w corresponding to about 1 line of the 525 lines from each sequential video frame, without any substantial loss of horizontal resolution. The focused zone extractor 206 may then send the extracted focused zones 351-355, each corresponding to about 1 line of the 525 lines from the respective sequential video frames 340-344, to the uphole receiver 216.

In various illustrative embodiments, a 30 feet per minute rate log, obtained by the downhole analog video camera 202 taking pictures at the rate of about 30 video frames per second, while moving up (or down) the well bore 134 as indicated by arrow 345, may sample about 6 inches (15 cm) of the well bore 134 every second spread over about 30 video frames, giving a vertical resolution of at least about 0.2 inches (0.5 cm) of the well bore 134 per video frame. For these various other alternative illustrative embodiments, since the focused zone extractor 206 may extract the focused zone 350 of width w corresponding to about 1 line of the 525 lines from each sequential video frame, a vertical resolution of at least about 0.2 inches (0.5 cm) of the well bore 134 may be obtained. The total number of bits required to encode only about 1 lines of the 525 lines from an analog color video frame, according to the CCIR-601 standard, is $8\times[(1\times858)+2\times(1\times429)]=8\times[(858)+2\times(429)]=13,728$. Consequently, sending only the new information contained in about 1 line of the 525 lines from each sequential video frame of an analog color video obtained at a rate of 30 video frames per second would require a data transmission rate of only about $4.1184\times10^5$ bits/s=411.84 kbits/s=51.48 kbytes/s, where 1 byte=8 bits. Sending a gray image instead of a color image would require only about half that amount of new information, giving a data transmission rate of only about $2.0592\times10^5$ bits/s=205.92 kbits/s=25.74 kbytes/s.

In various illustrative embodiments, generally, as shown in FIG. 3, the focused zone extractor 206 may extract a focused zone 350 of width w corresponding to at most about n lines of the 525 lines from each sequential video frame, without any substantial loss of horizontal resolution. The focused zone extractor 206 may then send the extracted focused zones 351-355, each corresponding to at most about n lines of the 525 lines from the respective sequential video frames 340-344, to the uphole receiver 216.

In various illustrative embodiments, generally, an R feet per minute rate log, obtained by the downhole analog video camera 202 taking pictures at the rate of about f video frames per second, while moving up (or down) the well bore 134 as indicated by the arrow 345, may sample about $$\frac{R}{5}$$

inches $$\left(\frac{2.54R}{5}\text{cm}\right)$$

of the well bore 134 every second spread over about f video frames, giving a vertical resolution of at least about $$\frac{R}{5f}$$

inches $$\left(\frac{2.54R}{5f}\text{cm}\right)$$

of the well bore 134 per video frame. For these various illustrative embodiments, since the focused zone extractor 206 may extract the focused zone 350 of width w corresponding to at most about n lines of the 525 lines from each sequential video frame, a vertical resolution of at least about $$\frac{R}{5nf}$$

inches $$\left(\frac{2.54R}{5nf}\text{cm}\right)$$

of the well bore 134 may be obtained. The total number of bits required to encode only about n lines of the 525 lines from an analog color video frame, according to the CCIR-601 standard, is $8\times[(n\times858)+2\times(n\times429)]=8\times[n\times(1716)]=13,728n$. Consequently, sending only the new information contained in at most about n lines of the 525 lines from each sequential video frame of an analog color video obtained at a rate of 30 video frames per second would require a data transmission rate of only at most about $30\times13,728n$ bits/s=411,840n bits/s=51,480n bytes/s, where 1 byte=8 bits. Sending a gray image instead of a color image would require only about half that amount of new information, giving a data transmission rate of only at most about $30\times6,864n$ bits/s=205,920n bits/s=25,740n bytes/s.

In various illustrative embodiments, to achieve higher resolution for the video log, more data may be transimitted. With existing digital transmission speeds, the data may have to be compressed. As shown in FIG. 2, the digital video signal 205, comprising only the extracted focused zones 351-355 on the respective sequential video frames 340-344, may undergo compression performed by data compressor 208. Any suitable technique of video data compression may be used in various illustrative embodiments. Non-limiting examples of suitable video data compression methods are ADPCM, cosine transform, and wavelet, and the like. Note that these compression methods may not preserve all of the original data.

Figure 5:
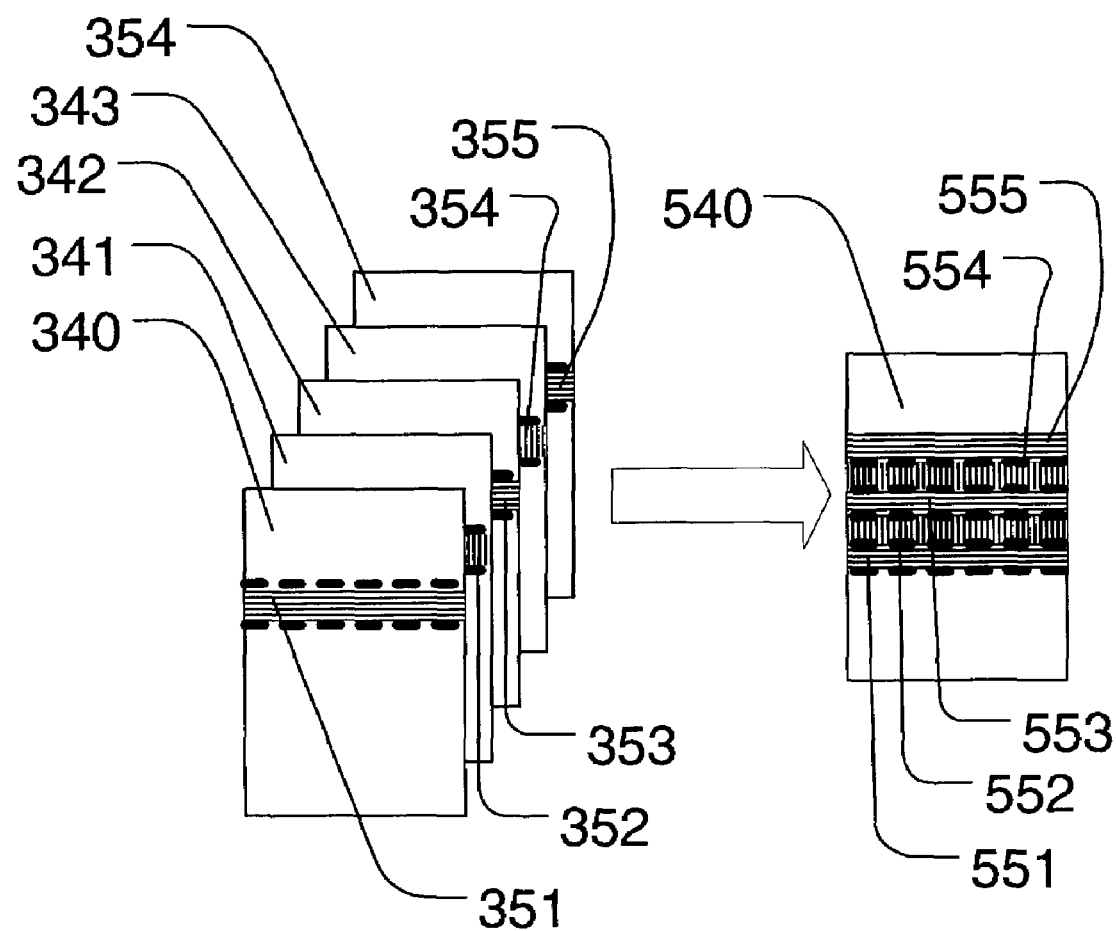

As shown in FIG. 5, wavelet compression may be used to compress the video digital signal 205. For example, using wavelet compression, prior to data compression by the data compressor 208, the extracted focused zones 351-355 on the respective separate sequential video frames 340-344 may be accumulated onto a new image frame 540 as accumulated extracted focused zones 551-555. Following the accumulation of the accumulated extracted focused zones 551-555 onto the new image frame 540, the whole new image frame 540 may then be compressed by the data compressor 208 and sent to multiplexer 212.

A downhole orientation sensor 210 may be used in various illustrative embodiments of the present invention. The downhole orientation sensor 210 may provide an orientation signal 211 that may be used to correct the visual signal for any tool rotation while logging. The downhole orientation sensor 210 may be any suitable sensor to correct for tool rotation while logging.

A downhole depth sensor 230 may be used in various illustrative embodiments of the present invention. The downhole depth sensor 230 may provide a depth signal 231 that may be used to associate the frame data with the respective depth in the well bore 134 and/or with the drilling depth log obtained while logging. The downhole depth sensor 230 may be any suitable sensor to associate the frame data with the respective depth in the well bore 134 and/or with the drilling depth log obtained while logging.

As shown in FIG. 2, the compressed video digital signal 205 and the orientation signal 211 and/or the depth signal 231 may be fed into the multiplexer 212. The multiplexer 212 may combine the compressed video digital signal 205 and the orientation signal 211 and/or the depth signal 231 to form a multiplexed signal 213. The multiplexer 212 may be any suitable device used to combine data signals.

The multiplexed signal 213 may be fed into a transmitter 214. The transmitter 214 may transmit the multiplexed signal 213 to the uphole receiver 216. The uphole receiver 216 may be any device suitable to receive data from the transmitter 214.

The multiplexed signal 213 may be de-multiplexed by a de-multiplexer 218 into the compressed video digital signal 205 and the orientation signal 211 and/or the depth signal 231. The de-multiplexer 218 may be any device suitable for separating data signals.

The compressed video digital signal 205 may be decompressed by a decompressor 220. The decompressor 220 may be any device suitable for decompressing data signals.

The orientation signal 211 and the decompressed video digital signal 205 may be fed into, and aligned by, an orientation corrector 222. The orientation corrector 222 may be any device suitable to provide image correction to compensate for any tool rotation while logging. The orientation corrector 222 provides a corrected data signal 223.

The corrected data signal 223 may undergo final processing by a surface data processor 224. The corrected data signal 223 may be combined with the depth signal 231 in the surface data processor 224. The surface data processor 224 may be any suitable device that to associates the frame data with the respective depth in the well bore 134 and/or with the drilling depth log obtained while logging and that also performs image correction to produce a final image 226 for the visual log. Non-limiting examples of video processing may include smoothing, filtering, edge detection, shape detection, and addition of color to emphasize one or more particular features of the image. In various illustrative embodiments, the person and/or persons viewing the video image on the surface 124 may select the type of processing option to emphasize one or more particular feature and/or image. Optionally, the visual signal may be used to simulate interactive video using three-dimensional (3D) visualization.

Figure 6:
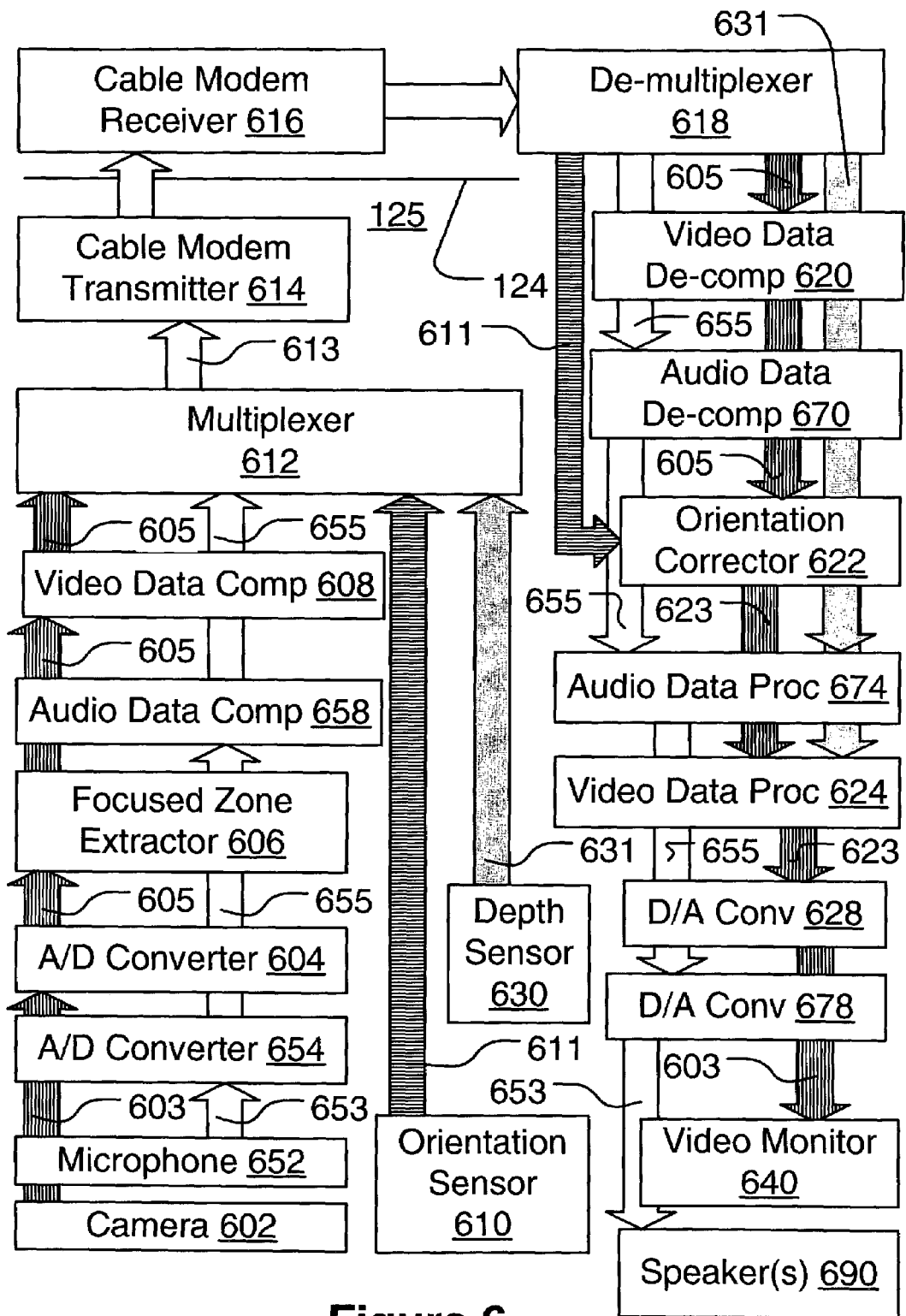

Referring now to FIG. 6, an illustrative embodiment of a method by which a downhole audio-video log may be obtained is schematically illustrated in the form of a flow chart. Audio information may be incorporated into the illustrative embodiment as shown in FIGS. 2-5. As shown in FIG. 6, an uphole surface cable modem receiver 616 receives data from a downhole analog video camera 602 and a downhole analog microphone 652 that may be disposed in the downhole video camera module 100. The uphole receiver 616 may be of any type suitable to receive data from the downhole analog video camera 602 and the downhole analog microphone 652. The downhole analog video camera 602 may be any type of visual data acquisitioner. The downhole analog microphone 652 may be any device suitable for obtaining audio data such as an audio signal. In various alternative illustrative embodiments, the downhole analog microphone 652 may be disposed separately from the the downhole analog video camera 602 and/or the downhole video camera module 100.

The downhole analog video camera 602 obtains a video analog data signal 603 that is converted into a video digital signal 605 via an analog-to-digital (A/D) converter 604. The analog-to-digital (A/D) converter 604 may be any suitable analog-to-digital (A/D) converter. Although the analog-to-digital (A/D) converter 604 is shown in FIG. 6 as being separate from the downhole analog video camera 602, in alternative illustrative embodiments, the analog-to-digital (A/D) converter 604 and the downhole analog video camera 602 may be integrated in such a way that the downhole video camera 602 itself generates the digital video signal 605. The video digital signal 605 may be transmitted to a focused zone extractor 606.

The downhole analog microphone 652 obtains an analog audio data signal 653 that is converted into a digital audio signal 655 via an analog-to-digital (A/D) converter 654. The analog-to-digital (A/D) converter 654 may be any suitable analog-to-digital (A/D) converter. Although the analog-to-digital (A/D) converter 654 is shown in FIG. 6 as being separate from the downhole analog microphone 652, in alternative illustrative embodiments, the analog-to-digital (A/D) converter 654 and the downhole analog microphone 652 may be integrated in such a way that the downhole microphone 652 itself generates the digital audio signal 655.

A downhole orientation sensor 610 may be used in various illustrative embodiments of the present invention. The downhole orientation sensor 610 may provide an orientation signal 611 that may be used to correct the visual signal for any tool rotation while logging. The downhole orientation sensor 610 may be any suitable sensor to correct for tool rotation while logging. The orientation signal 611 provided by the downhole orientation sensor 610 may be a digital signal, as shown in FIG. 6. In various alternative illustrative embodiments, the downhole orientation sensor 610 may produce an analog signal and the digital orientation signal 611 may then be the signal put out by an analog-to-digital (A/D) converter similar to the analog-to-digital (A/D) converters 604 and/or 654.

A downhole depth sensor 630 may be used in various illustrative embodiments of the present invention. The downhole depth sensor 630 may provide a depth signal 631 that may be used to associate the frame data with the respective depth in the well bore 134 and/or with the drilling depth log obtained while logging. The downhole depth sensor 630 may be any suitable sensor to associate the frame data with the respective depth in the well bore 134 and/or with the drilling depth log obtained while logging. The depth signal 631 provided by the downhole depth sensor 630 may be a digital signal, as shown in FIG. 6. In various alternative illustrative embodiments, the downhole depth sensor 630 may produce an analog signal and the digital depth signal 631 may then be the signal put out by an analog-to-digital (A/D) converter similar to the analog-to-digital (A/D) converters 604 and/or 654.

The digital audio signal 655 may undergo compression by an audio data compressor 658. Any suitable technique of digital audio data compression may be utilized. The video digital signal 605 may also undergo compression by a video data compressor 608, as described above.

As shown in FIG. 6, the compressed video digital signal 605 and the compressed digital audio signal 655, and, in various illustrative embodiments, the orientation signal 611 and/or the depth signal 631, may be fed into the multiplexer 612. The multiplexer 612 may combine the compressed video digital signal 205 and the compressed digital audio signal 655, and, in various illustrative embodiments, the orientation signal 611 and/or the depth signal 631, to form a multiplexed audio-visual signal 613. The multiplexer 612 may be any suitable device used to combine data signals and operates as described above.

The multiplexed audio-visual signal 613 may be fed into a cable modem transmitter 614. The cable modem transmitter 614 may transmit the multiplexed audio-visual signal 613 to the uphole surface cable modem receiver 616. The cable modem transmitter 614 may be any device suitable to transmit data to the uphole surface cable modem receiver 616. The uphole surface cable modem receiver 616 may be any device suitable to receive data from the cable modem transmitter 614.

The multiplexed audio-visual signal 613 may be de-multiplexed by a de-multiplexer 618 into the compressed video digital signal 605 and the compressed digital audio signal 655, and, in various illustrative embodiments, the orientation signal 611 and/or the depth signal 631. The de-multiplexer 618 may be any device suitable for separating data signals and operates as described above.

The compressed digital audio signal 655 may be decompressed by an audio data decompressor 670. The audio data decompressor 670 may be any device suitable for decompressing data signals. The compressed video digital signal 605 may be decompressed by a video data decompressor 620. The video data decompressor 620 may be any device suitable for decompressing data signals, as described above.

In those various illustrative embodiments that include the orientation sensor 610, the orientation signal 611 and the decompressed video digital signal 605 may be fed into, and aligned by, an orientation corrector 622. The orientation corrector 622 may be any device suitable to provide image correction to compensate for any tool rotation while logging. The orientation corrector 622 provides a corrected data signal 623, as described above.

The corrected data signal 623 may undergo final processing by a surface video data processor 624. The corrected data signal 623 may be combined with the depth signal 631 in the surface video data processor 624. The surface video data processor 624 may be any suitable device that to associates the frame data with the respective depth in the well bore 134 and/or with the drilling depth log obtained while logging and that also performs image correction to produce a final image (similar to the final image 226 described above with reference to FIG. 2) for the visual log. Non-limiting examples of video processing may include smoothing, filtering, edge detection, shape detection, and addition of color to emphasize one or more particular features of the image. In various illustrative embodiments, the person and/or persons viewing the video image on the surface 124 may select the type of processing option to emphasize one or more particular feature and/or image. Optionally, the visual signal may be used to simulate interactive video using three-dimensional (3D) visualization.

The decompressed digital audio signal 655 may undergo final processing by a surface audio data processor 674. The surface audio data processor 674 may be any suitable device that utilizes any suitable techniques to process the decompressed digital audio signal 655. Non-limiting examples of suitable audio processing techniques may include standard frequency domain and time domain filters, wavelet processing, and neural network processing. The surface audio data processor 674 could accomplish noise reduction and/or enhancement of particular sound frequencies. For example, the surface audio data processor 674 could enhance such sounds as those from gas bubbles and/or sand particles entering the well bore 134.

The decompressed digital audio signal 655 may be combined with the depth signal 631 in the surface audio data processor 674. The surface audio data processor 674 may be any suitable device that to associates the audio data with the respective depth in the well bore 134 and/or with the drilling depth log obtained while logging for the audio-visual log. In various illustrative embodiments, the person and/or persons hearing the audio output from a speaker and/or speakers 690 on the surface 124 may select the type of processing option to emphasize one or more particular feature and/or sound. Optionally, the audio-visual signal may be used to simulate interactive audio-video using three-dimensional (3D) visualization and/or stereo and/or surround sound.

The processed digital audio signal 655 may be converted back to the analog audio data signal 653 via a digital-to-analog (D/A) converter 678. The digital-to-analog (D/A) converter 678 may be any suitable digital-to-analog (D/A) converter that converts a digital signal to an analog signal.

The analog audio data signal 653 may then be delivered through the speaker and/or speakers 690. The speaker and/or speakers 690 may be any suitable device and/or devices capable of delivering and/or playing the analog audio data signal 653. Optionally, the intensity of the analog audio data signal 653 could be plotted with the video log and/or correlated with the video image.

The processed digital video signal 623 (605 in those various illustrative embodiments that do not include the orientation sensor 610 and the orientation corrector 622) may be converted back to the video analog data signal 603 via a digital-to-analog (D/A) converter 628. The digital-to-analog (D/A) converter 628 may be any suitable digital-to-analog (D/A) converter that converts a digital signal to an analog signal, as described above.

The video analog data signal 603 may then be imaged on and/or through a video monitor and/or video monitors 640. The video monitor and/or video monitors 640 may be any suitable device and/or devices capable of delivering and/or playing the analog video data signal 603.

The inventors believe that the addition of downhole audio to the video allows a person and/or persons on the surface, viewing the video transmission, to also "hear" what is occurring downhole. For example, the inventors believe that one may be able audibly to distinguish between the entry of gas, sand, oil, and/or water and/or combinations thereof into the well bore 134.

Figure 8:
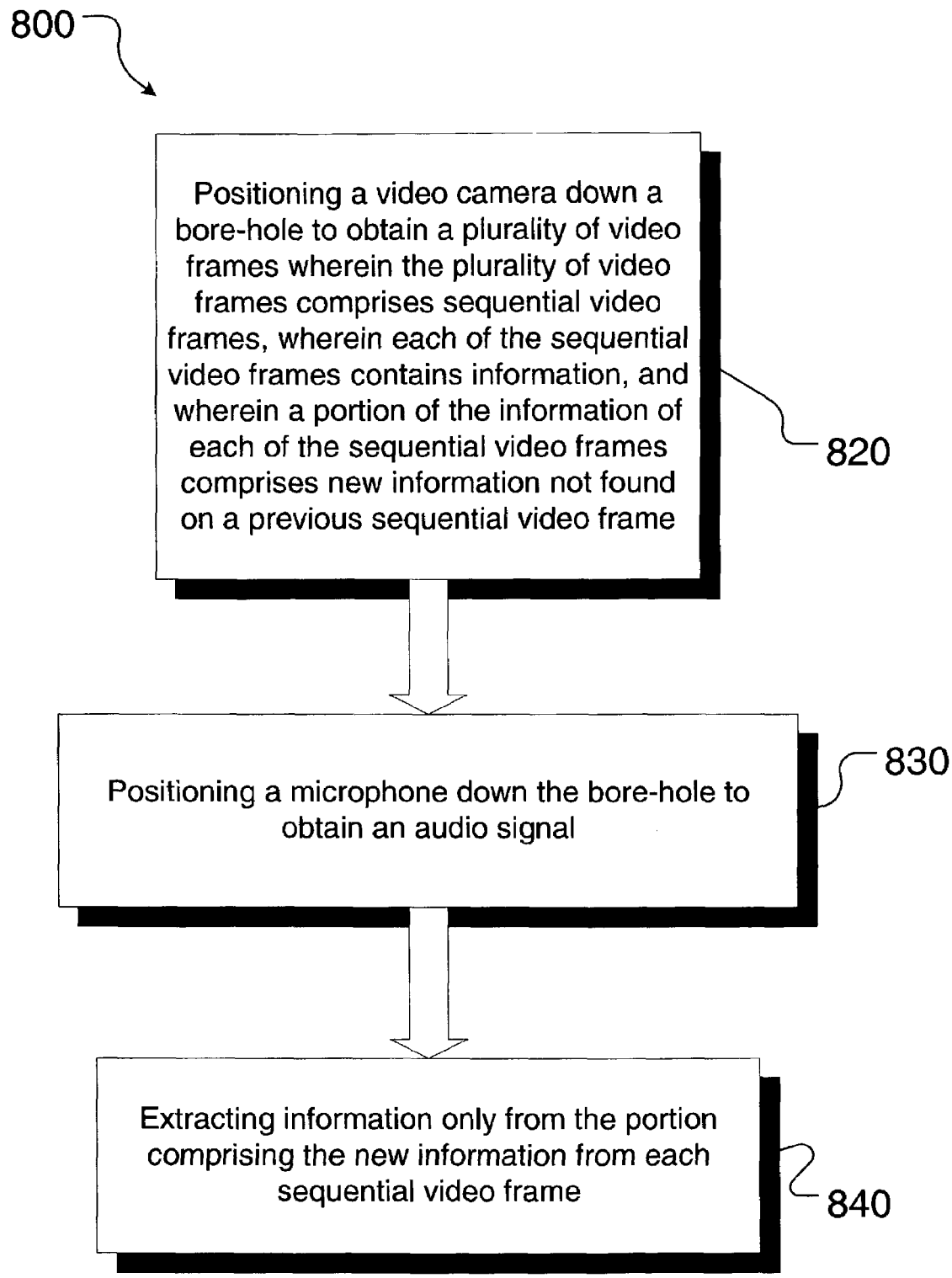

FIGS. 7-8 schematically illustrate particular embodiments of respective methods 700-800 practiced in accordance with the present invention. FIGS. 1-6 schematically illustrate various exemplary particular embodiments with which the methods 700-800 may be practiced. For the sake of clarity, and to further an understanding of the invention, the methods 700-800 shall be disclosed in the context of the various exemplary particular embodiments shown in FIGS. 1-6. However, the present invention is not so limited and admits wide variation, as is discussed further below.

As shown in FIG. 7, the method 700 begins, as set forth in box 720, by positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. For example, as shown in FIG. 1, a drilling operation according to various illustrative embodiments is shown, including the drilling rig 120 and the downhole video module 100. The drilling rig 120 is generally a rotary drilling rig of the type that is well known in the drilling art and comprises the mast 122 that rises above the ground 124. The rotary drilling rig 120 is fitted with lifting gear (not shown) from which is suspended the drill string 126 formed by the multiplicity of drill pipes 128 screwed into one another, the drill string 126 having at its lower downhole end the drill bit 132 for the purpose of drilling the well bore 134. The downhole video camera module 100 may be located in the drill string 126 in any suitable location and by any suitable manner know to those in the relevant art.

As shown in FIG. 2, an illustrative embodiment of a method by which a downhole video log may be obtained is schematically illustrated in the form of a flow chart. Generally, the uphole receiver 216 receives data from the downhole analog video camera 202 disposed in the downhole video camera module 100.

As shown in FIG. 7, the method 700 proceeds by extracting information only from the portion comprising the new information from each sequential video frame, as set forth in box 730. For example, as shown in FIGS. 3-5, the operation of the focused zone extractor 206 in various illustrative embodiments is schematically described in more detail, as described above.

In various illustrative embodiments, as shown in FIG. 8, the method 800 begins, as set forth in box 820, by positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame. For example, as shown in FIG. 1, a drilling operation according to various illustrative embodiments is shown, including the drilling rig 120 and the downhole video module 100. The drilling rig 120 is generally a rotary drilling rig of the type that is well known in the drilling art and comprises the mast 122 that rises above the ground 124. The rotary drilling rig 120 is fitted with lifting gear (not shown) from which is suspended the drill string 126 formed by the multiplicity of drill pipes 128 screwed into one another, the drill string 126 having at its lower downhole end the drill bit 132 for the purpose of drilling the well bore 134. The downhole video camera module 100 may be located in the drill string 126 in any suitable location and by any suitable manner know to those in the relevant art.

As shown in FIG. 6, an illustrative embodiment of a method by which a downhole audio-video log may be obtained is schematically illustrated in the form of a flow chart. Generally, the uphole receiver 616 receives data from the downhole analog video camera 602 disposed in the downhole video camera module 100, as described above.

As shown in FIG. 8, the method 800 proceeds by positioning a microphone down the bore-hole to obtain an audio signal, as set forth in box 830. For example, as shown in FIG. 6, an illustrative embodiment of a method by which a downhole audio-video log may be obtained is schematically illustrated in the form of a flow chart. Generally, the uphole receiver 616 receives data from both the downhole analog video camera 602 and the downhole analog audio microphone 652, as described above.

The method 800 then proceeds, as set forth in box 840, by extracting information only from the portion comprising the new information from each sequential video frame. For example, as shown in FIGS. 3-5, the operation of the focused zone extractor 206 in various illustrative embodiments is schematically described in more detail, as described above.

Any of the above-disclosed embodiments of a method, a system and a device according to the present invention enables the creation of a visual well-bore log that does not suffer from one or more of the deficiencies of the prior art, deficiencies such as the large memory and/or storage requirements for conventional video logs and/or the inefficient incorporation of digital audio data with a digital video log. Additionally, any of the above-disclosed embodiments of a method, a system and a device according to the present invention enables the creation of a digital video log that utilizes less memory and/or storage capacity than conventional video logs, while providing more relevant information than that provided by conventional video logs. In addition, many of the above-disclosed embodiments of a method, a system and a device according to the present invention enable the creation of a digital audio-video log that efficiently incorporates digital audio data with a digital video log.

The particular embodiments disclosed above, and described with particularity, are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed:

1. A system for obtaining video data comprising:
 a video camera positioned down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
 a focused zone extractor positioned down the bore-hole to extract a focused zone of information only from the portion comprising the new information from each sequential video frame; and
 a transmitter to send the focused zones extracted from the sequential video frames up the bore-hole to a receiver.

2. The system of claim 1, further comprising:
 at least one of a tool orientation sensor and a depth sensor.

3. The system of claim 2, further comprising at least one of:
 an orientation corrector adapted to receive the extracted focused zone information and a signal from the tool orientation sensor and to provide image correction to compensate for tool rotation; and
 a video data processor adapted to receive the extracted focused zone information and a signal from the depth sensor and to correlate tool depth information with the extracted focused zones.

4. The system of claim 1, further comprising a digital storage device for storing the focused zone information to form a video log of the bore-hole.

5. The system of claim 1, wherein the focused zones extracted from the sequential video frames contain digital images of each portion of the bore-hole imaged in the plurality of video frames, such that the focused zones can be combined to form a complete video log of the imaged length of the bore-hole.

6. The system of claim 1, wherein the focused zone extractor is adapted to extract information from a portion of each sequential video frame for which the imaged region of the bore-hole received at least half of the maximum reflection light intensity available when the video frame was obtained.

7. A system for obtaining video data comprising:
a video camera positioned down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
a microphone positioned down the bore-hole to obtain an audio signal;
a focused zone extractor to extract a focused zone of information only from the portion comprising the new information from each sequential video frame; and
a transmitter to send the focused zones extracted from the sequential video frames up the bore-hole to a receiver.

8. The system of claim 7, further comprising:
at least one of a tool orientation sensor and a depth sensor.

9. The system of claim 7, further comprising a multiplexer adapted to combine the extracted focused zones with the audio signal.

10. The system of claim 7, wherein the focused zones extracted from the sequential video frames contains digital images of each portion of the bore-hole imaged in the plurality of video frames, such that the focused zones can be combined to form a complete video log of the imaged length of the bore-hole.

11. The system of claim 7, further comprising an audio data processor adapted to receive the audio signal in digital form.

12. The system of claim 11, further comprising a depth sensor, and wherein the audio data processor is further adapted to receive a signal from the depth sensor and to correlate tool depth information with the audio signal.

13. A method of obtaining video data comprising:
positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
extracting a focused zone of information only from the portion comprising the new information from each sequential video frame; and
transmitting the focused zones extracted from the sequential video frames up the bore-hole to a receiver.

14. The method of claim 13, further comprising:
at least one of correcting for tool orientation while logging and correlating tool depth information with the extracted focused zones.

15. The method of claim 14, wherein:
said correcting for tool orientation comprises sending the focused zones and a signal from a tool orientation sensor to an orientation corrector; and
said correlating tool depth information comprises sending the focused zones and a signal from a depth sensor to a video data processor.

16. The method of claim 13, further comprising storing the focused zone information in a digital storage device to form a video log of the bore-hole.

17. The method of claim 13, wherein said extracting a focused zone of information comprises extracting focused zones that collectively contains digital images of each portion of the bore-hole imaged in the plurality of video frames, such that the extracted focused zones can be combined to form a complete video log of the imaged length of the bore-hole.

18. The method of claim 13, wherein said extracting a focused zone of information comprises extracting information from a portion of each sequential video frame for which the imaged region of the bore-hole received at least half of the maximum reflection light intensity available when the video frame was obtained.

19. A method for obtaining video data comprising:
positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
positioning a microphone down the bore-hole to obtain an audio signal;
extracting a focused zone of information only from the portion comprising the new information from each sequential video frame; and
transmitting the focused zones extracted from the sequential video frames up the bore-hole to a receiver.

20. The method of claim 19, further comprising:
at least one of correcting for tool orientation while logging and correlating tool depth information with the extracted focused zones.

21. The method of claim 19, further comprising multiplexing the focused zones with the audio signal.

22. The method of claim 19, wherein said extracting a focused zone of information comprises extracting focused zones that collectively contains digital images of each portion of the bore-hole imaged in the plurality of video frames, such that the focused zones can be combined to form a complete video log of the imaged length of the bore-hole.

23. The method of claim 19, further comprising processing the audio signal using an audio data processor.

24. The method of claim 23, wherein said processing the audio signal comprises correlating tool depth information with the audio signal.

25. A computer-readable, program storage device, encoded with instructions that, when executed by a computer, perform a method comprising:
positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
extracting a focused zone of information only from the portion comprising the new information from each sequential video frame; and
transmitting the focused zones extracted from the sequential video frames up the bore-hole to a receiver.

26. The device of claim 25, the method further comprising:
at least one of correcting for tool orientation while logging and correlating tool depth information with the extracted focused zones.

27. The device of claim 26, wherein:
said correcting for tool orientation comprises sending the focused zones and a signal from a tool orientation sensor to an orientation corrector; and
said correlating tool depth information comprises sending the focused zones and a signal from a depth sensor to a video data processor.

28. The device of claim 25, the method further comprising storing the focused zone information in a digital storage device to form a video log of the bore-hole.

29. The device of claim 25, wherein said extracting a focused zone of information comprises extracting focused zones that collectively contains digital images of each portion of the bore-hole imaged in the plurality of video frames, such that the focused zones can be combined to form a complete video log of the imaged length of the bore-hole.

30. The device of claim 25, wherein said extracting a focused zone of information comprises extracting information from a portion of each sequential video frame for which the imaged region of the bore-hole received at least half of the maximum reflection light intensity available when the video frame was obtained.

31. A computer-readable, program storage device, encoded with instructions that, when executed by a computer, perform a method comprising:
positioning a video camera down a bore hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
positioning a microphone down the bore-hole to obtain an audio signal;
extracting a focused zone of information only from the portion comprising the new information from each sequential video frame; and
transmitting the focused zones extracted from the sequential video frames up the bore-hole to a receiver.

32. The device of claim 31, the method further comprising:
at least one of correcting for tool orientation while logging and correlating tool depth information with the extracted focused zones.

33. The device of claim 31, the method further comprising multiplexing the focused zones with the audio signal.

34. The device of claim 31, wherein said extracting a focused zone of information comprises extracting focused zones that collectively contains digital images of each portion of the bore-hole imaged in the plurality of video frames, such that the focused zones can be combined to form a complete video log of the imaged length of the bore-hole.

35. The device of claim 31, the method further comprising processing the audio signal using an audio data processor.

36. The device of claim 35, wherein said processing the audio signal comprises correlating tool depth information with the audio signal.

37. A computer programmed to perform a method comprising:
positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
extracting a focused zone of information only from the portion comprising the new information from each sequential video frame; and
transmitting the focused zones extracted from the sequential video frames up the bore-hole to a receiver.

38. The computer of claim 37, the method further comprising:
at least one of correcting for tool orientation while logging and correlating tool depth information with the extracted focused zones.

39. The computer of claim 38, wherein:
said correcting for tool orientation comprises sending the focused zones and a signal from a tool orientation sensor to an orientation corrector; and
said correlating tool depth information comprises sending the focused zones and a signal from a depth sensor to a video data processor.

40. The computer of claim 37, the method further comprising storing the focused zone information in a digital storage device to form a video log of the bore-hole.

41. The computer of claim 37, wherein said extracting a focused zone of information comprises extracting focused zones that collectively contains digital images of each portion of the bore-hole imaged in the plurality of video frames, such that the focused zones can be combined to form a complete video log of the imaged length of the bore-hole.

42. The computer of claim 37, wherein said extracting a focused zone of information comprises extracting information from a portion of each sequential video frame for which the imaged region of the bore-hole received at least half of the maximum reflection light intensity available when the video frame was obtained.

43. A computer programmed to perform a method comprising:
positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
positioning a microphone down the bore-hole to obtain an audio signal;
extracting a focused zone of information only from the portion comprising the new information from each sequential video frame; and
transmitting the focused zones extracted from the sequential video frames up the bore-hole to a receiver.

44. The computer of claim 43, the method further comprising:
at least one of correcting for tool orientation while logging and correlating tool depth information with the extracted focused zones.

45. The computer of claim 43, the method further comprising multiplexing the focused zones with the audio signal.

46. The computer of claim 43, wherein said extracting a focused zone of information comprises extracting focused zones that collectively contains digital images of each portion of the bore-hole imaged in the plurality of video frames, such that the focused zones can be combined to form a complete video log of the imaged length of the bore-hole.

47. The computer of claim 43, the method further comprising processing the audio signal using an audio data processor.

48. The computer of claim 47, wherein said processing the audio signal comprises correlating tool depth information with the audio signal.

49. A device comprising:
  means for positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
  means for extracting a focused zone of information only from the portion comprising the new information from each sequential video frame; and
  means for transmitting the focused zones extracted from the sequential video frames up the bore-hole to a receiver.

50. The device of claim 49, further comprising:
  at least one of means for correcting for tool orientation while logging and means for correlating tool depth information with the extracted focused zones.

51. The device of claim 49, further comprising means for storing the focused zone information in digital form as a video log of the bore-hole.

52. The device of claim 49, wherein the focused zones extracted from the sequential video frames collectively contain digital images of each portion of the bore-hole imaged in the plurality of video frames, such that the focused zones can be combined to form a complete video log of the imaged length of the bore-hole.

53. The device of claim 49, wherein the means for extracting a focused zone of information is adapted to extract information from a portion of each sequential video frame for which the imaged region of the bore-hole received at least half of the maximum reflection light intensity available when the video frame was obtained.

54. A device comprising:
  means for positioning a video camera down a bore-hole to obtain a plurality of video frames wherein the plurality of video frames comprises sequential video frames, wherein each of the sequential video frames contains information, and wherein a portion of the information of each of the sequential video frames comprises new information not found on a previous sequential video frame;
  means for positioning a microphone down the bore-hole to obtain an audio signal;
  means for extracting a focused zone of information only from the portion comprising the new information from each sequential video frame; and
  means for transmitting the focused zones extracted from the sequential video frames up the bore-hole to a receiver.

55. The device of claim 54, further comprising:
  at least one of means for correcting for tool orientation while logging and means for correlating tool depth information with the extracted focused zones.

56. The device of claim 54, further comprising means for multiplexing the focused zone information with the audio signal.

57. The device of claim 54, wherein the focused zones extracted from the sequential video frames collectively contain digital images of each portion of the bore-hole imaged in the plurality of video frames, such that the focused zones can be combined to form a complete video log of the imaged length of the bore-hole.

58. The device of claim 54, further comprising means for processing the audio signal in digital form.

59. The device of claim 58, further comprising means for correlating tool depth information with the audio signal.

* * * * *

UNITED STATES PATENT AND TRADEMARK OFFICE
CERTIFICATE OF CORRECTION

PATENT NO. : 7,705,878 B2  Page 1 of 1
APPLICATION NO. : 10/437498
DATED : April 27, 2010
INVENTOR(S) : Batakrishna Mandal and Wallace R. Gardner It is certified that error appears in the above-identified patent and that said Letters Patent is hereby corrected as shown below:

Claim 10:
Column 19, Line 32 - Please delete the word "contains" and substitute therefor --contain--.

Claim 17:
Column 20, Line 6 - Please delete the word "contains" and substitute therefor --contain--.

Claim 22:
Column 20, Line 39 - Please delete the word "contains" and substitute therefor --contain--.

Claim 29:
Column 21, Line 13 - Please delete the word "contains" and substitute therefor --contain--.

Claim 34:
Column 21, Line 49 - Please delete the word "contains" and substitute therefor --contain--.

Claim 41:
Column 22, Line 23 - Please delete the word "contains" and substitute therefor --contain--.

Claim 46:
Column 22, Line 59 - Please delete the word "contains" and substitute therefor --contain--.

Signed and Sealed this

Thirtieth Day of November, 2010

David J. Kappos
*Director of the United States Patent and Trademark Office*